UNITED STATES PATENT OFFICE.

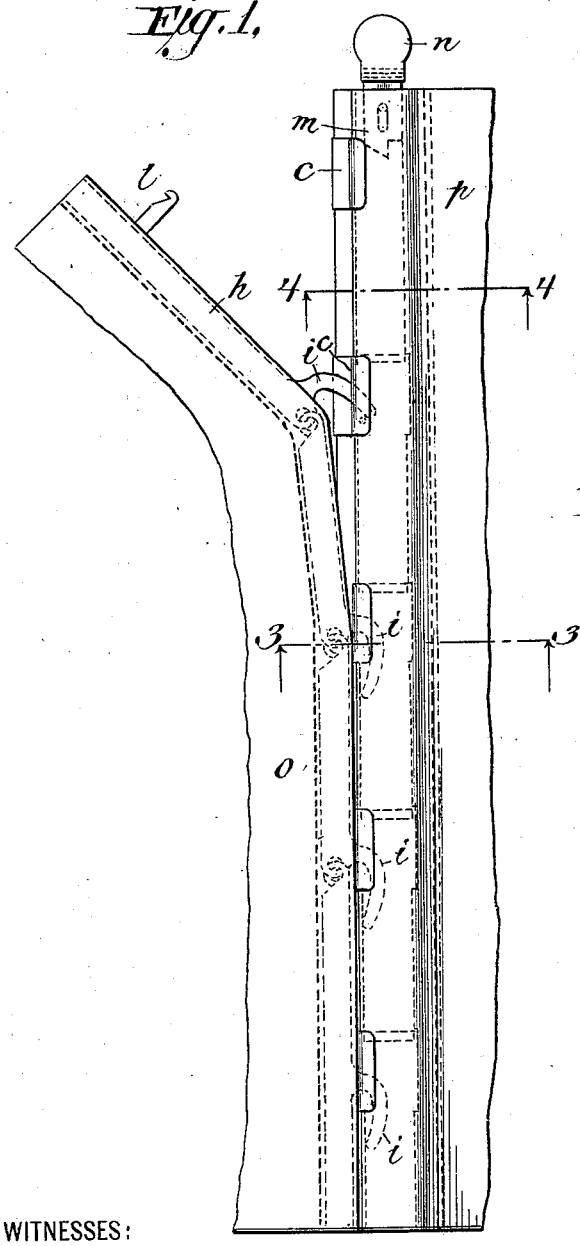

ALFRED SHEDLOCK, OF JERSEY CITY, NEW JERSEY.

CORSET-FASTENER.

SPECIFICATION forming part of Letters Patent No. 661,082, dated November 6, 1900.

Application filed March 26, 1900. Serial No. 10,170. (No model.)

*To all whom it may concern:*

Be it known that I, ALFRED SHEDLOCK, a citizen of the United States, residing at Jersey City, in the county of Hudson and State of New Jersey, have invented certain new and useful Improvements in Corset-Fasteners, of which the following is a specification.

The corset-fastener forming the subject of this invention when in use presents a smooth unbroken surface without projecting parts to wear or tear the dress or corset-covering. It is more readily applied than the ordinary stud-and-eye fastener, the parts being so formed and arranged that the lever principle is utilized to directly draw the two parts of the fastener together. The parts when so connected are so securely locked that accidental separation is entirely avoided, and the parts of the fastener instantly become detached when it is desired to remove the corset without any exertion or strain on the part of the wearer.

This improved corset-fastener is characterized by a new mode of operation and certain novel features of construction, which, without waiving constructive equivalents in whole or in part, may be described in general terms as follows: As usual, the fastener may comprise two members to be applied to the meeting edges of the corset. One may, as usual, be rigid and has formed on it or applied to it a series of pockets, seats, or sockets however formed. The other member has a corresponding number of hooks or catches which are adapted to enter and be retained in such pockets or sockets and is capable of flexing laterally or edgewise adjacent to each of such hooks. The general relation and coöperation of the parts is such that each hook enters its socket with a movement lateral and inwardly into the socket and is firmly retained therein so long as the part of the meeting edge of the corset above it is held in position parallel with the socket member of the fastener, but readily leaves it when such part of the meeting edge is allowed or caused to assume an angular position inclining away from the edge of the socket member. Thus, commencing at one end of the fastener, each hook may in its turn be seated in its socket and so be held firmly. Finally, the meeting edges at the other end of the fastener are locked together by any suitable catch capable of being unfastened or released to permit of the separation or ready falling apart of the meeting edges throughout their length. Each point of flexure is in effect a center, from which the point of the hook describes such an arc as to enter and seat in its recess or socket, and the edge of the hook and the edge of the socket may be so related that as this movement occurs the effect is to draw together the meeting edges at that point. I prefer that the flexing member or meeting edge shall be composed of sheet-metal sections flexibly connected and that the hook on each such section shall be at one of its ends adjacent to its point of flexure. Of course if such a form for the fastening should be considered desirable the sections need not be flexibly connected directly to each other, but may be secured within the usual covering or part of the corset fabric with their ends in proper proximity, and the fabric itself between the ends will permit sufficient flexure at such points.

Figure 1 of the accompanying drawings illustrates a corset-fastener made according to my invention, showing the two members in part connected together in locked position and in part in the act of being locked together. Fig. 2 is a front view of a portion of the metallic parts of the fastener on an enlarged scale. Fig. 3 is a transverse section on the line 3 3, Fig. 1, of the member of the fastener containing the pockets. Fig. 4 is a similar view on the line 4 4, Fig. 1; and Fig. 5 is a longitudinal section of Fig. 2 on the line 5 5, also showing the fabric covering.

An embodiment of my invention is included in a structure embracing in one part or member of a corset-fastener a series of pockets fully closed with the exception of lateral openings at their sides near or at the edge of this part of the fastener, the other member of the fastener being composed of sections, preferably formed of sheet metal, of a length about equal to the distance between the pockets, hinged together at their ends in such manner as to be free to assume angular positions relative to one another. Each of said sections is formed with a lateral hook-shaped projection adapted to be entered in a lateral opening of a pocket when the section carrying the hook is placed in angular position to the pocket member of the fastener and to act on the edge of the pocket when the section is moved into position against the pocket side of the fastener. All of said hooks when so manipulated act as levers by their sliding action over the edge of the pockets and draw the two parts of the fastener together. Said hooks when so fully entered into the pockets constitute perfect locks to securely connect the two parts of the fastener together, as fully illustrated in Fig. 1 of the drawings, which clearly shows the positions occupied by the different parts of the fastener when being manipulated to bring the two parts together and when brought together in lock position. The last or upper section of the hook side of the corset is provided near its outer end with a catch device which enters the pocket at or near the end of the other member of the fastener, which pocket is provided with a counterpart of the catch adapted to engage therewith and so firmly hold the parts of the fastener together at this end. This counterpart of the catch may be of sliding character and is provided with a finger-piece or projection extending beyond the end of the fastener, so as to be easily manipulated in completing the locking of the members together or releasing them to permit of their separation, which instantly occurs without any exertion on the part of the wearer as soon as the catch is freed.

The mechanical embodiment of the device, as shown in the drawings, which is one of many that may be practically adopted and modifications of which will readily suggest themselves to the manufacturer, comprises in the pocket-carrying portion of the fastener a strip of metal $a$, preferably made elastic or consisting of elastic or flexible material, pieces of sheet material $b$, formed at one end so as to embrace the front edge of the strip $a$, extending over its front side and bent so as to constitute a pocket $c$. Each of said pieces has an extension $d$, formed to lie along the front of the strip $a$ to the pocket-formed portion of the adjacent piece and offset downwardly, as shown at $e$, to form a lip seating under the top of the pocket of the adjacent piece, partition-pieces $f$, formed of wire, preferably spring-acting, as shown in Fig. 2, bent at their ends to form eyes and located between the strip $a$ and pieces $b\ d$. Rivets $g$ pass through the strip $a$, the pieces $b$, and the eyes formed in the wire partition-pieces $f$, and so securely fasten all of these parts together. By this arrangement a flat, strong, and elastic device is formed, the connecting parts $e$ of the pieces $b\ d$ by their sliding action permitting it to readily conform to the shape of the wearer and to freely give or bend under movements without inconvenience to the wearer. The other member of the fastener is composed of strips $h$, having at one of their ends laterally-projecting hooks $i$ and also at this end a hole or opening $j$ and having formed at their other ends a closed hook or loop $k$ to engage with the opening $j$ of the succeeding section or strip of this member of the fastener. This construction applies to all of the sections $h$ with the exception of the last or upper one, which has formed near its end a laterally-extended catch or hook $l$, which enters the pocket at or near the end of the other member of the fastener. This pocket is provided with the sliding counter-latch $m$, provided with a finger-piece $n$, by means of which the latch $m$ may be pressed inwardly to engage with catch or hook $l$ upon the completion of the connection of the two members of the fastener together and be pulled outwardly to release the catch $l$ when it is desired to cause the separating of the two parts of the corset in its removal from the wearer.

It is usual in corset-fasteners to provide them with a suitable fabric covering, which either constitutes a part of the corset or is attached to the corset after being applied to the fastener to connect the fastener to the corset. The hinged member of the fastener in this case is shown provided in Fig. 1 with a fabric covering $o$, and the pocket-provided member is shown in Figs. 1, 3, 4, and 5 provided with a fabric covering $p$. This covering $p$ is shown as extending under the strip $a$, around its front edge over its face to the wire pieces $f$, inwardly around the wire pieces $f$, over the outer surfaces of the pieces $b\ d$, and is connected together by stitches at the rear edge of the strip $a$. This fabric covering $p$ is provided with slits where the pocket portions of the parts $b$ are located, one of the edges of said slits lying between the pieces $b$ and the strip $a$ and the other edges clamped in the overturn edge in that part of the piece $b$ which forms the top of the pocket, as shown at Fig. 3.

The distance that the ends of the hooks extend beyond the ends of the strips $h$ may be varied as desired and according to the extent of leverage and drawing action it is required or thought desirable to impart to the fastener in its application to draw or force the parts of the fastener together. This application of the lever principle to a device of this kind will be fully appreciated and readily understood by the examination of Figs. 1 and 2 of the drawings.

To more securely connect the pieces $b$ to the strip $a$, they may be provided with lips cut from the part forming the lower sides of the pockets and bent around and under the rear edge of the strip $a$, as shown at $q$, Fig. 3.

I claim as my invention—

1. A corset-fastener forming or adapted to form the meeting edges of a corset comprising two members, one having a series of seats or sockets and the other capable of flexing edgewise at intervals and having a corresponding series of hooks each adapted to enter its socket with a lateral and inward movement as the meeting edge above it is brought toward the other member.

2. A corset-fastener forming or adapted to form the meeting edges of a corset comprising two members, one having a series of seats or sockets and the other capable of flexing edgewise at intervals and having a corresponding series of hooks, each adapted to enter its socket with a lateral and inward movement as the meeting edge above it is brought toward the other member, and a fastening device for securing the two members together at or near one of their ends.

3. A corset-fastener forming or adapted to form the meeting edges of a corset comprising two members, one having a series of seats or sockets, and the other a flexing member composed of sections joined together, the first section having a laterally-extending hook at or near its free end and the other sections each having a laterally-extending hook adjacent to its pivotal connection, the last section having at or near its free end a fastening device adapted to connect to the end of the other member of the fastener.

4. A corset-fastener having its main side or member provided with pockets having lateral openings, and its other side or member composed of sections hinged or flexibly connected together and provided with laterally-projecting hooks adapted to enter and engage with the pockets.

5. A corset-fastener having its main side or member provided with pockets having lateral openings, and its other side or member composed of sections hinged or flexibly connected together and provided with laterally-projecting hooks adapted to enter and engage with the pockets, one of the end sections being provided with a catch formed to enter an end pocket of the main member and to engage with a counterpart in said pocket.

6. A corset-fastener having its main side or member provided with pockets having lateral openings, and its other side or member composed of sections hinged or flexibly connected together and provided with laterally-projecting hooks extending beyond the ends which are flexibly connected to another section; said hooks being formed so as to enter the pocket-openings with the sections in angular positions to the main member and to act as levers to draw the two members together as the sections are moved alongside the pocket member.

7. A corset-fastener having its main side or member provided with pockets having lateral openings, and its other side or member composed of sections hinged or flexibly connected together and provided with laterally-projecting hooks adapted to enter and engage with the pockets, one of the end sections being provided with a catch formed to enter an end pocket of the main member, and a counterpart catch in said pocket having a projecting finger-piece by means of which it may be manipulated.

8. In a corset-fastener, in combination, a member comprising a strip of flexible metal; pieces of sheet metal shaped and connected to the strip to form pockets at intervals on the strip, and having extensions making sliding connections with the adjacent pockets, and intervening partition-pieces; and another member composed of sections hinged or flexibly connected together and provided with laterally-projecting hooks.

9. In a corset-fastener, in combination, a member comprising a strip of flexible metal, pieces of sheet metal shaped and connected to the strip to form pockets at intervals on the strip, and having extensions making sliding connections with the adjacent pockets, a sliding latch located in one of the end pockets, and intervening partition-pieces; and another member composed of sections hinged or flexibly connected together and provided with laterally-projecting hooks, one of the sections being provided with a catch adapted to engage with the sliding latch in the end pocket.

In testimony whereof I have hereunto subscribed my name.

ALFRED SHEDLOCK.

Witnesses:
ARTHUR C. BLATZ,
M. NIXON.